United States Patent
Gray et al.

(10) Patent No.: US 6,790,804 B2
(45) Date of Patent: Sep. 14, 2004

(54) MAGNESIUM-DIKETONATE COMPLEX DERIVED POLYOLEFIN CATALYSTS, METHOD OF MAKING SAME, METHOD OF POLYMERIZING WITH SAME

(75) Inventors: Steven D. Gray, League City, TX (US); Tim J. Coffy, Houston, TX (US); Edwar S. Shamshoum, Gibsonia, PA (US)

(73) Assignee: Fina Technology, Inc., Houston, TX (US)

(*) Notice: Subject to any disclaimer, the term of this patent is extended or adjusted under 35 U.S.C. 154(b) by 0 days.

(21) Appl. No.: 10/186,262

(22) Filed: Jun. 27, 2002

(65) Prior Publication Data
US 2004/0002419 A1 Jan. 1, 2004

(51) Int. Cl.⁷ .......................... B01J 31/00; B01J 37/00; C08F 4/02; C08F 4/00
(52) U.S. Cl. .................. 502/103; 502/104; 502/115; 502/172; 525/21
(58) Field of Search ................. 502/103, 104, 502/115, 172; 525/21

(56) References Cited

U.S. PATENT DOCUMENTS

| | | | |
|---|---|---|---|
| 6,281,301 B1 * | 8/2001 | Morini et al. | 526/124.3 |
| 6,294,497 B1 * | 9/2001 | Morini et al. | 502/127 |
| 6,437,061 B1 * | 8/2002 | Sacchetti et al. | 526/124.2 |
| 6,465,383 B2 * | 10/2002 | Williams | 502/103 |
| 6,486,274 B1 * | 11/2002 | Gray et al. | 526/119 |

* cited by examiner

Primary Examiner—Mark L. Bell
Assistant Examiner—Jennine M. Brown
(74) Attorney, Agent, or Firm—Madan, Mossman & Sriram, PC

(57) ABSTRACT

A process of forming a polyolefin catalyst component includes contacting a metal compound of the formula $MR_2$ with a diketone to form a metal bis(diketonate) having the formula $M(OCRCR'CRO)_2$, wherein M is a Group IIA or Group VIIB metal, and wherein R and R' are each hydrocarbyls or substituted hydrocarbyls having from 1 to 20 carbons atoms. Catalyst components, catalysts, polyolefin polymers, catalysts systems, and methods of preparing same are disclosed.

14 Claims, 9 Drawing Sheets

Comparison of catalyst PSD for catalyst 1 and conventional catalyst.

Figure 1. Comparison of catalyst PSD for catalyst 1 and conventional catalyst.
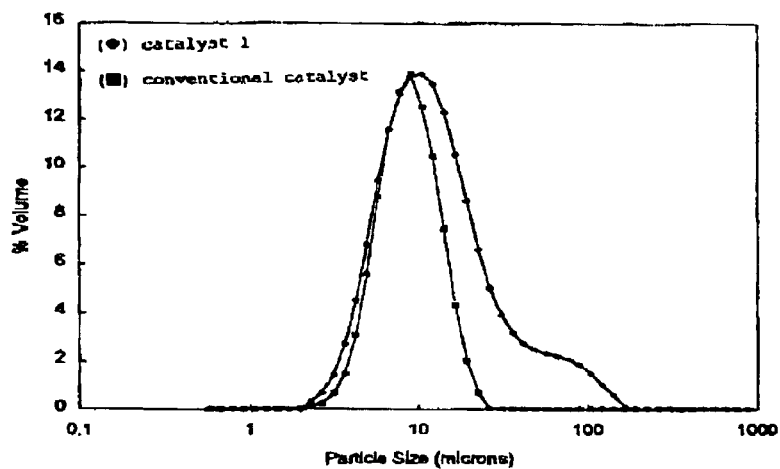
Figure 2. Comparison of Fluff PSD for catalyst 1 and a conventional catalyst.
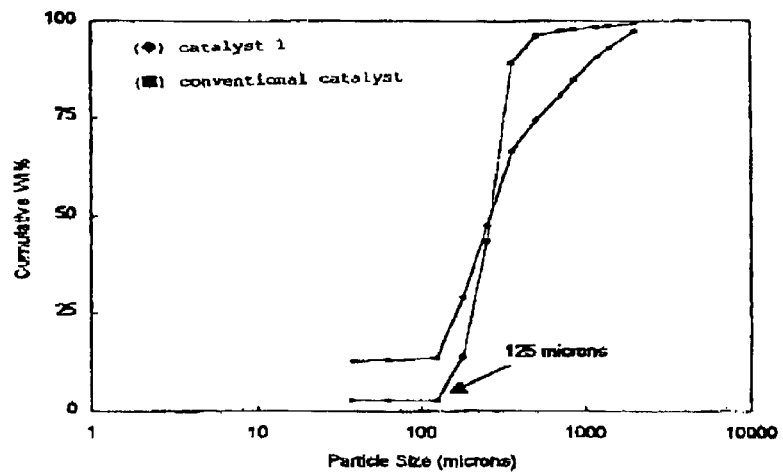

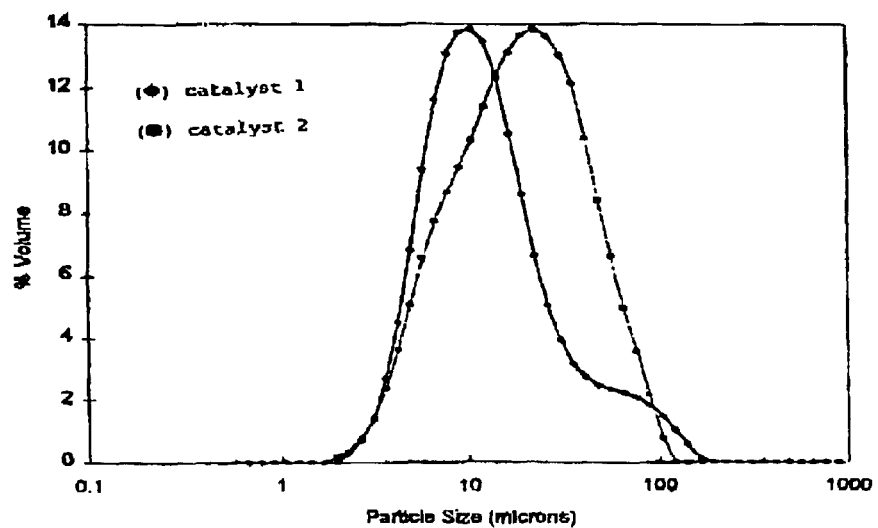
Figure 3. Comparison of Catalyst PSD for catalyst 2 and catalyst 1.

Figure 4. Comparison of Fluff PSD for catalyst 2 and catalyst 1.
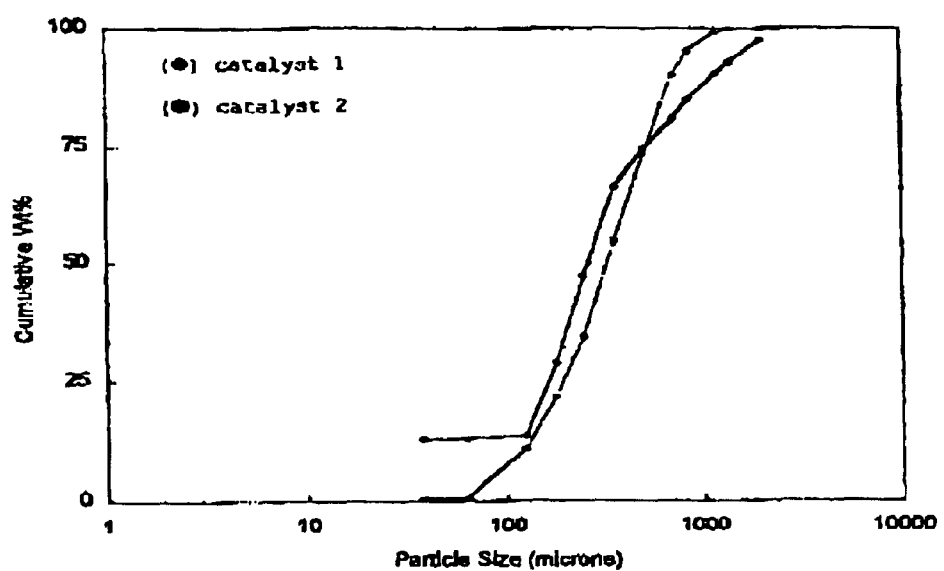

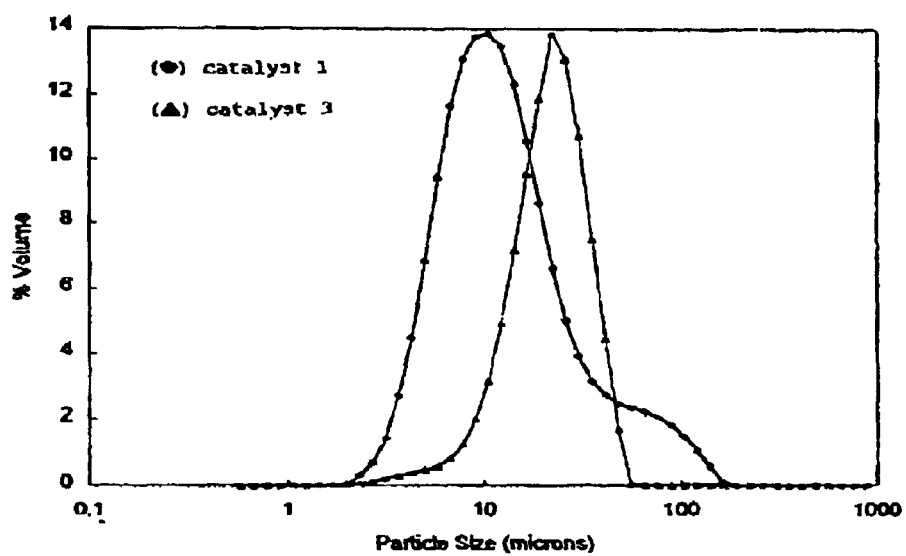
Figure 5. Comparison of Catalyst PSD for catalyst 3 and catalyst 1

Figure 6. Comparison of Fluff PSD for catalyst 3 and catalyst 1
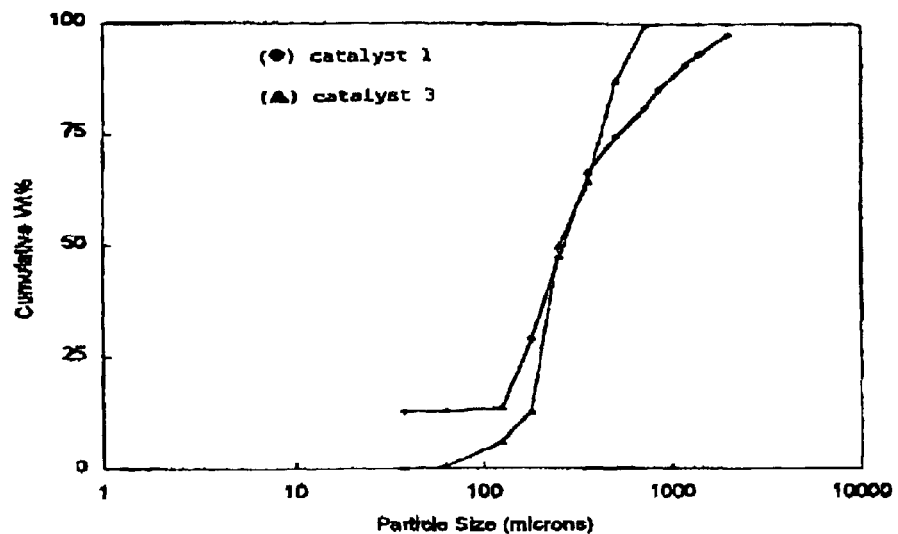
Figure 7. Comparison of Catalyst PSD for catalyst 4 and catalyst 3
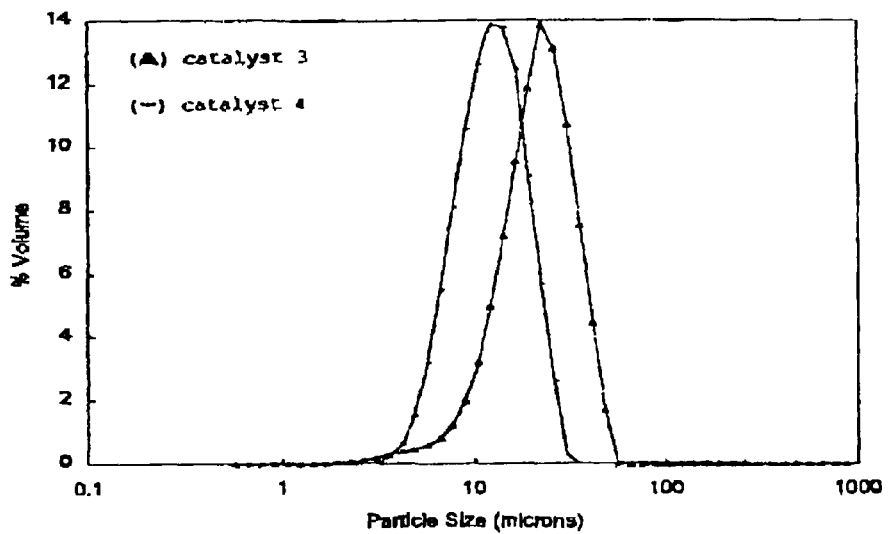

Figure 8. Comparison of Fluff PSD for catalyst 4 and catalyst 3
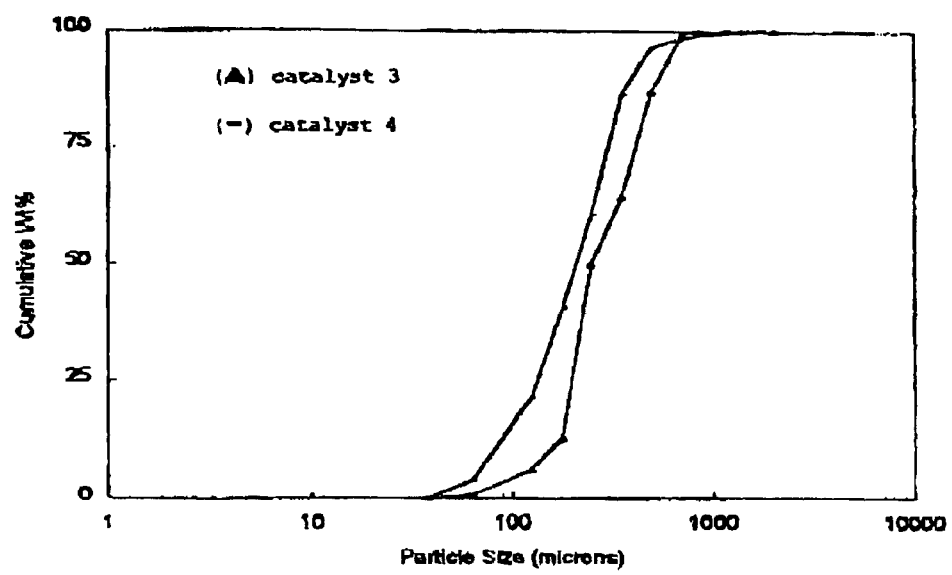

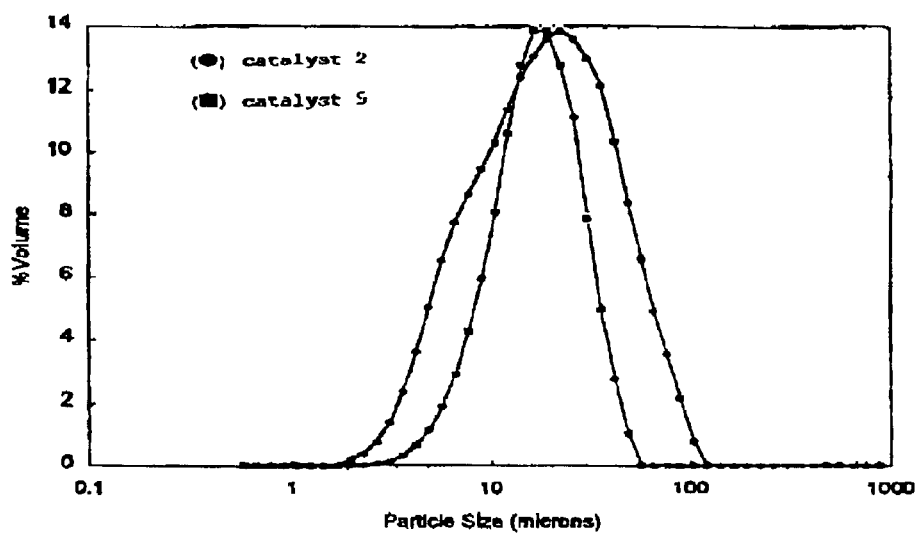
Figure 9. Comparison of Catalyst PSD for catalyst 5 and catalyst 2

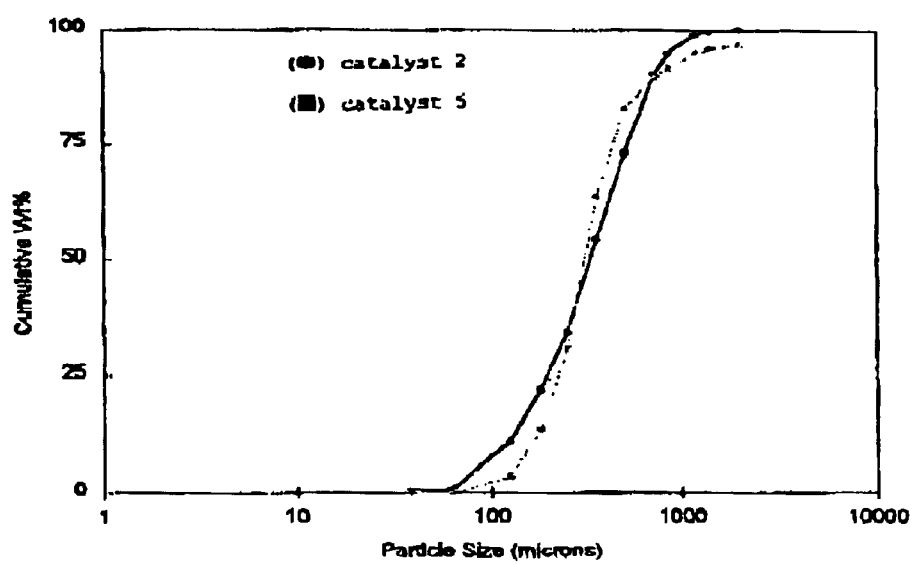
Figure 10. Comparison of Fluff PSD for catalyst 5 and catalyst 2

Figure 11. Comparison of Catalyst PSD for catalyst 6 and catalyst 3
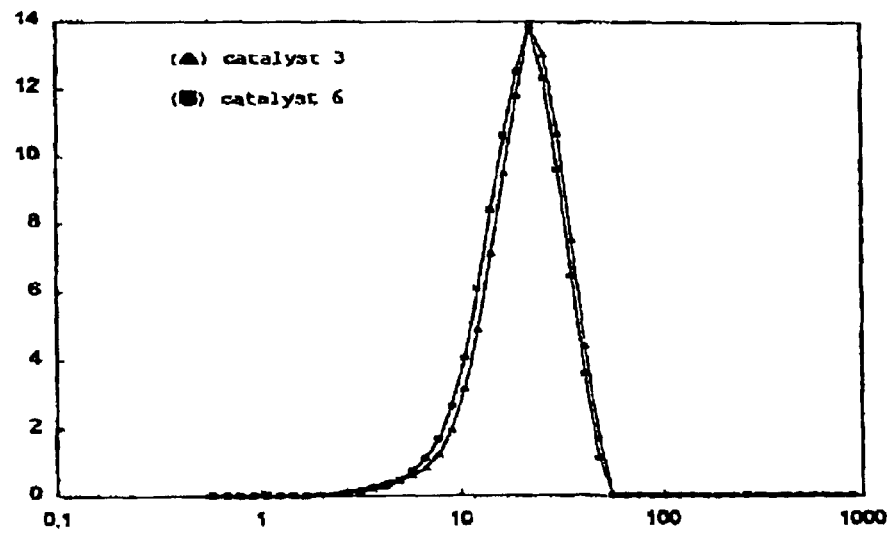
Figure 12. Comparison of Fluff PSD for catalyst 6 and catalyst 3
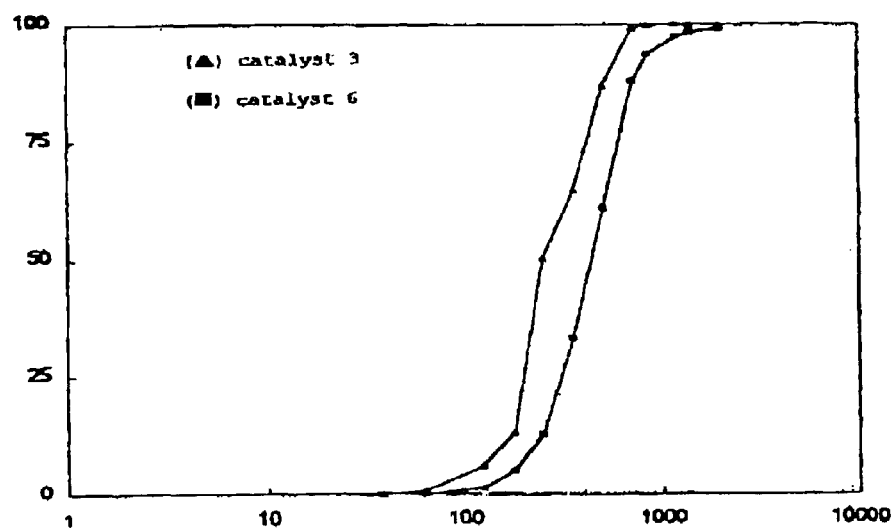

MAGNESIUM-DIKETONATE COMPLEX DERIVED POLYOLEFIN CATALYSTS, METHOD OF MAKING SAME, METHOD OF POLYMERIZING WITH SAME

BACKGROUND OF THE INVENTION

1. Field of the Invention

The present invention relates to catalysts, a method of making catalysts, and a process for polymerizing olefins. In another aspect, the present invention relates to polyolefin catalysts, a method of making polyolefin catalysts, and a method of polymerizing olefins. In even another aspect, the present invention relates to polyolefin catalysts derived from diketonate complexes, a method of making polyolefin catalysts from diketonate complexes, and a method of polymerizing olefins from such catalysts. In still another aspect, the present invention relates to polyolefin catalysts derived from (bis)diketonate complexes of magnesium with titanium halides, a method of making polyolefin catalysts from (bis) diketonate complexes of magnesium with titanium halides, and a method of polymerizing olefins from such catalysts.

2. Description of the Related Art

Having been around since the early 1950's, Ziegler-type polyolefin catalysts, their general methods of making, and subsequent use, are well known in the polymerization art.

However, while much is known about Ziegler-type catalysts, there is a constant search for improvements in their polymer yield, catalyst life, catalyst activity, and in their ability to produce polyolefins having certain properties.

U.S. Pat. No. 4,472,521, issued Sep. 18, 1984 to Band, discloses a polyolefin catalyst made by contacting a $Mg(OR)_2$ and/or $Mn(OR)_2$ with titanium tetrachloride, then with a titanium tetrachloride halogenating agent, and then with an electron donor.

U.S. Pat. No. 4,673,661, issued Jun. 16, 1987, and U.S. Pat. No. 4,724,255, issued Feb. 9, 1988, both to Lofgren et al. disclose a polyolefin catalyst component made by chlorinating a magnesium alkyl which is then contacted with titanium tetrachloride, a Lewis base, and then at least once with titanium tetrachloride in the absence of a Lewis base. Lofgren et al. teach the criticality of an electron donor at the first titanium tetrachloride treatment step and further teach that away from the presence of an electron donor at subsequent titanation steps.

U.S. Pat. No. 4,855,271, issued Aug. 8, 1989, and U.S. Pat. No. 4,937,300, both to McDaniel et al. disclose a polyolefin catalyst derived from alumina impregnated with magnesium alkoxide, which is subsequently contacted with a lower order alcohol, chlorinated with silicon tetrachloride, and subsequently etched with a titanium tetrachloride.

U.S. Pat. No. 5,075,270, issued Dec. 24, 1991 to Brun et al. discloses a polyolefin catalyst made by reacting a magnesium alkoxide with an aluminosiloxane derivative, which product is then chlorinated with silicone tetrachloride, followed by transition metal treatment with titanium tetrachloride, with an electron donor optionally associated with the transition metal.

Even with these prior art methods there is still a need for improved polyolefin catalysts, methods of their making, and methods of polymerizing.

There is another need for polyolefin catalysts having improved activity.

There is even another need for polyolefin catalysts having controlled morphology.

These and other needs in the art will become apparent to those of skill in the art upon review of this patent specification.

SUMMARY OF THE INVENTION

It is one object of the present invention to provide for improved polyolefin catalysts, methods of their making, and methods of polymerizing.

It is another object of the present invention to provide for polyolefin catalysts having improved polymer yields.

It is another object of the present invention to provide for polyolefin catalysts having controlled morphology.

These and other objects of the present invention will become apparent to those of skill in the art upon review of this patent specification.

According to one embodiment of the present invention, there is provided a process for preparing a catalyst component. This process generally includes contacting a metal compound of the formula $MR_2$ with a diketone to form a metal bis (diketonate), wherein M is a Group IIA metal, and R is a hydrocarbyl or substituted hydrocarbyl having from 1 to 20 carbons atoms. The process further includes contacting the metal bis(ketonate) with a halogenating agent to form a catalyst component.

According to another embodiment of the invention, there is provided a process for forming a polyolefin catalyst. Generally the process comprises: a) contacting a catalyst component with an organometallic compound to form a catalyst. The catalyst component is produced by a process comprising: i) contacting a metal compound of the formula $MR_2$ with a diketone to form a metal bis(diketonate) having the formula $M(OCRCR'CRO)_2$, wherein M is a Group IIA or Group VIIB metal, and wherein R and R' are each hydrocarbyls or substituted hydrocarbyls having from 1 to 20 carbons atoms; ii) contacting the metal bis(ketonate) with a first halogenating agent to form reaction product A, and may further comprise the step of iii) contacting reaction product A with a second halogenating agent.

According to even another embodiment of the invention, there is provided a process of making a catalyst system. The process comprises contacting a polyolefin catalyst with an inert support. Preferably the inert support is a magnesium compound. The catalyst is produced by a process comprising: i) contacting a metal compound of the formula $MR_2$ with a diketone to form a metal bis(diketonate) having the formula $M(OCRCR'CRO)_2$, wherein M is a Group IIA or Group VIIB metal, and wherein R and R' are each hydrocarbyls or substituted hydrocarbyls having from 1 to 20 carbons atoms; and ii) contacting the metal bis(ketonate) with a first halogenating agent to form reaction product A. The process of making the catalyst may further comprise the steps of: iii) contacting reaction product A with a second halogenating agent to form a catalyst component, and iv) contacting the catalyst component with an organometallic agent, such as, for example. TEAl, to form a catalyst.

According to still another embodiment of the invention, there is provided a process for α-olefin polymerization. The process comprises: a) contacting one or more α-olefin monomers together in the presence of a catalyst of the invention. Generally the catalyst of the invention is produced by a process comprising: i) contacting a metal compound of the formula $MR_2$ with a diketone to form a metal bis(diketonate) having the formula $M(OCRCR'CRO)_2$, wherein M is a Group IIA or Group VIIB metal, and R and R' are hydrocarbyls or substituted hydrocarbyls having from 1 to 20 carbons atoms; and ii) contacting the metal bis (ketonate) with a, first halogenating agent to form reaction product A.

A suitable diketonate can have a structure such as, for example:

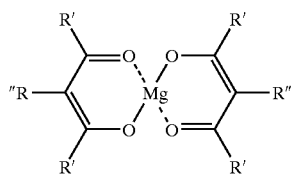

According to yet another embodiment of the invention, there is provided a polyolefin catalyst component produced by a process comprising contacting a metal compound of the formula $MR_2$ with a diketone to form a metal bis(diketonate) having the formula $M(OCRCR'CRO)_2$, and contacting the metal bis(ketonate) with a first halogenating agent to form reaction product A. The catalyst component making process may further comprise a step of contacting reaction product A with a second halogenating agent to form a catalyst component. In the above formula, generally M is a Group IIA or Group VIIB metal, and R and R' are each hydrocarbyls or substituted hydrocarbyls having from 1 to 20 carbons atoms.

According to even still another embodiment of the invention, there is provided a polyolefin catalyst produced by a process comprising contacting a catalyst component produced by a method of the invention with an organometallic compound.

According to even yet another embodiment of the invention, there is provided a catalyst system comprising an inert support and a polyolefin catalyst of the invention, wherein the polyolefin catalyst is produced by a method of the invention. Preferably the inert support is a magnesium compound.

According to still even another embodiment of the invention, there is provided a polymer produced by a process comprising contacting one or more α-olefin monomers together in the presence of a catalyst of the invention. The process further comprises extracting polyolefin polymers. Preferably, the polymer of the invention has a molecular weight distribution of at least 4.

BRIEF DESCRIPTION OF THE FIGURES

FIG. 1 compares the catalyst particle size distribution (PSD) for catalyst 1 (♦) made in Example 1 to a conventional catalyst (■).

FIG. 2 provides a comparison of the fluff particle size distribution of catalyst 1 (♦) to that of a conventional catalyst (■).

FIG. 3 provides a comparison of the particle size distribution for catalyst 2 (○) to that of catalyst 1 (♦).

FIG. 4 provides a comparison of the fluff particle size distribution for catalyst 2 (○) to that of catalyst 1 (♦).

FIG. 5 provides a comparison of the particle size distribution for catalyst 3 (▲) to that of catalyst 1 (♦).

FIG. 6 provides a comparison of the fluff particle size distribution for catalyst 3 (▲) to that of catalyst 1 (♦).

FIG. 7 provides a comparison of the particle size distribution for catalyst 4 (–) to that of catalyst 3 (▲).

FIG. 8 provides a comparison of the fluff particle size distributions of catalyst 4 (–) to that of catalyst 3 (▲).

FIG. 9 provides a comparison of the particle size distribution for catalyst 5 (■) to that of catalyst 2 (○).

FIG. 10 provides a comparison of the fluff particle size distribution given by catalyst 5 (■) to that given by catalyst 2 (○).

FIG. 11 provides a comparison of the catalyst particle size distribution for catalyst 6 (■) to that given by catalyst 3 (▲).

FIG. 12 provides a comparison of the fluff particle size distribution given by catalyst 6 (■) to that given by catalyst 3 (▲).

DETAILED DESCRIPTION OF THE INVENTION

In the method of the present invention a catalyst component is obtained by the halogenation of a metal bis (diketonate). This metal bis(diketonate) may be formed by contacting a metal dialkyl with a diketone.

The general formula of the preferred metal dialkyl is $MR_2$, wherein M is any suitable metal, and each R is independently selected from among hydrocarbyl or substituted hydrocarbyl moieties having from 1 to 20 carbon atoms.

In the above formula, M is preferably a Group IIA metal, most preferably Mg. In the above formula, R is preferably a hydrocarbyl or substituted hydrocarbyl moiety having from 2 to 10 carbon atoms, and more preferably R is a hydrocarbyl or substituted hydrocarbyl moiety having from 2 to 6 carbon atoms, and most preferably, R has from 2 to 4 carbon atoms.

In the present invention, suitable metal dialkyls may generally be described as a metal having two alkyl groups appended thereto. The alkyl groups are each independently selected from among unsubstituted and substituted alkyls have in the range of 1 to 10 carbons atoms. Preferably, the alkyl groups have in the range of 1 to 4 carbon atoms, more preferably in the range of 2 to about 4 carbons atoms. Non-limiting examples of metal dialkyls suitable for use in the present invention include butylethylmagnesium and dibutylmagnesium.

Diketonates suitable for use in the present invention may generally be described as electronically saturated, sterically-hindered four-coordinate magnesium compexes of low oligomerization propensity. Suitable diketonates include those of the general formulas $Mg(RCOR'OCR)_2$, and $Mg(OCRCR'CRO)_2$, wherein R and R' are substituted or unsubstituted hydrocarbon radicals generally having in the range of about 1 to about 20 carbons atoms, preferably in the range of about 1 to about 8 carbons atoms, and more preferably in the range of about 1 to about 4 carbon atoms. A non-limiting example of suitable diketonates include those of the general formula $Mg(OCRCR'CRO)_2$, wherein R and R' are independently selected from t-Butyl, methyl, methylethyl, and hydrogen.

In the practice of the present invention of forming the metal bis (diketonate), the metal dialkyl is generally contacted with the diketone at conditions suitable to yield the desired metal bis(diketonate).

Suitable temperatures for the contacting of the metal dialkyl with the diketonate are generally in the range of about –20° C. to about 100° C., preferably in the range of about 0° C. to about 50° C., and more preferably in the range of about 0° C. to about 25° C.

In the practice of the present invention, the metal dialkyl and diketone may be contacted together in any suitable solvent or reaction medium. Non-limiting examples of suitable solvents or reaction media include toluene, heptane, hexane, octane and the like.

In the practice of the present invention, halogenating agents useful for halogenating the metal bis(diketonate), include any halogenating agent which when utilized in the present invention will yield a suitable catalyst. Chlorides are the preferred halogenating agents.

Non-limiting examples of suitable halogenating agents include Group III, Group IV and Group V halides, hydrogen halides, or the halogens themselves. Specific examples of preferred halogenating agents are $BCl_3$, $AlCl_3$, $CCl_4$, $SiCl_4$, $TiCl_4$, $ZrCl_4$, $VOCl_4$, $VOCl_2$, $CrOCl_2$, $SbCl_5$, $POCl_2$, $PCl_5$, $HfCl_4$, and $Ti(OR)_N Cl_{4-N}$, wherein R is an alkyl having 1 to 8 carbon atoms, and n is from 0 to 3.5, and mixtures of any of two or more of the foregoing. Other halogenating agents include alkyl halo silanes of the formula $R_X SiX_{(4-X)}$, wherein X is a halogen, R is a substituted or unsubstituted hydrocarbyl having 1 to 20 carbon atoms, and X is a halogen.

More preferred halogenating agents are $SiCl_4$, $TiCl_4$, and $Ti(OR)_N Cl_{4-N}$, and mixtures of any of two or more of the foregoing. The most preferred halogenating agent being a mixture of $TiCl_4$, and $Ti(OR)_N Cl_{4-N}$. The molar ratio of $TiCl_4$ to $Ti(OR)_N Cl_{4-N}$ is generally in the range of about 1 to about 4, more preferably in the range of about 1 to about 3, and even more preferably in the range of about 1 to about 2.

In the practice of the present invention, there is generally at least one halogenation step, preferably at least two. A non-limiting example of a suitable halogenation treatment includes, a first halogenation treatment with a mixture of $TiCl_4$, and $Ti(OR)_N Cl_{4-N}$, followed by a second halogenation treatment with $TiCl_4$.

In the practice of the present invention the halogenation of the metal bis(diketonate) is carried out under conditions suitable to yield the desired catalyst component.

Suitable temperatures for halogenating are generally in the range of about −20° C. to about 100° C., preferably in the range of about 0° C. to about 50° C. and more preferably in the range of about 0° C. to about 25° C.

In the practice of the present invention, halogenation is conducted at a molar ratio of halogenating agent to metal bis(diketonate) generally in the range of about 0.25 to about 8.0, preferably in the range of about 0.25 to about 4.0, and more preferably in the range of about 0.25 to about 2.0.

In the practice of the present invention, the halogenating contacted together in any suitable solvent or reaction medium. Non-limiting examples of suitable solvents or reaction media include toluene, heptane, hexane, octane and the like.

The solid product precipitated in the halogenation step is the desired catalyst component which is then recovered by any suitable recovery technique. This desired catalyst component may then be utilized as a precurser for the production of a controlled morphology Ziegler-Natta-type catalyst.

In the practice of the present invention it is generally desirable to utilize an electron donor for treating the catalyst component, and may be added during or after the halogenation step.

Electron donors for use in the preparation of polyolefin catalysts are well known, and any suitable electron donor may be utilized in the present invention which will provide a suitable catalyst.

Electron donors, also known as Lewis bases, are organic compounds of oxygen, nitrogen, phosphorous, or sulfur which can donate an electron pair to the catalyst.

The electron donor may be a monofunctional or polyfunctional compound, advantageously selected from among the aliphatic or aromatic carboxylic acids and their alkyl esters, the aliphatic or cyclic ethers, ketones, vinyl esters, acryl derivatives, particularly alkyl acrylates or methacrylates and silanes. A preferred example of a suitable electron donor is di-n-butyl phthalate.

The amount of electron donor utilized will generally vary over a broad range and is generally in the range of about 0.01 to about 2 equivalents, preferably in the range of about 0.05 to about 0.5 equivalents.

The catalyst precurser may be contacted with the electron donor for a contacting period in the range of about 0.5 hours to about 4 hours, preferably in the range of about 1 hours to about 2 hours.

Suitable temperatures for the electron donor step are generally in the range of about 20° C. to about 90° C.

The cocatalyst component made by the above described process may be combined with an organoaluminum cocatalyst component to form a catalyst system suitable for the polymerization of olefins. Typically, the cocatalysts which are used together with the transition metal containing catalyst component are organometallic compounds of Group Ia, IIa, and IIIa metals such as aluminum alkyls, aluminum alkyl hydrides, lithium aluminum alkyls, zinc alkyls, magnesium alkyls and the like. Preferable organometallic compounds employed in the practice of the present invention are trialkylaluminum cocatalysts, most preferably trialkylaluminum.

External donors which may be utilized in the preparation of a catalyst according to the present invention include those known in the art, and include alkoxysilanes.

The catalysts of the present invention can be used for the polymerization of any type of α-olefins. For example, the present catalyst is useful for catalyzing ethylene, propylene, butylene, pentene, hexene, 4-methylpentene and other α-alkenes having at least 2 carbon atoms, and also for mixtures thereof. Preferably, the catalysts of the present invention are utilized for the polymerization of ethylene to produce polyethylene, most preferably polyethylene with a controlled powder morphology.

Olefin polymerization methods are well known in general, and any suitable method may be utilized.

EXAMPLES

The following non-limiting examples are provided merely to illustrate the invention, and are not meant to limit the scope of the claims.

Raw Materials

BEM-1 (15.5% by weight in heptane) and TEAl (24.8% by weight in heptane) were purchased from Akzo and used as received. $TiCl_4$, $Ti(OBu)_4$, acac, EPD, and TMHD were purchased from Aldrich and were used as received. DIAE was purchased from Aldrich and dried with 5A molecular sieves prior to use. $ClTi(O^1Pr)_3$ was obtained from Gelest and was used without purification. Heptane was purified by passing it at a rate of 12 mL/min through a column of 3A molecular sieves, a F200 alumina column, and finally a column filled with BASF R3-11 copper catalyst.

General Procedures

All manipulations were performed under an inert atmosphere of Argon or Nitrogen using standard Schlenkline and drybox techniques. Catalyst particle size data was performed on the Malvern Mastersizer using catalyst slurry samples taken at various stages of the catalyst preparation. Fluff particle size data were obtained by sieving analyses using a CSC Scientific Sieve Shaker. Polymerization were performed under the following standard conditions: temperature of 80° C.; pressure of 125 psi; $H_2/C_2=0.25$; reaction time of 60 minutes; $AlR_3$ cocatalyst; diluent=2L hexene.

General Overview of Examples

Mg(TMHD)$_2$ appeared to be an attractive precursor for the production of a controlled morphology Ziegler-Natta catalyst. Accordingly, in the following examples, Mg(TMHD)$_2$ was subjected to a variety of chlorination procedures. (TMHD=2,4-tetramethylheptadione.)

Example 1

Direct Precipitation with TiCl$_4$ (Catalyst 1)

In the drybox, a five-necked, one-liter flask was equipped with a 125 mL addition funnel, a mechanical stirring shaft with a flattened, half moon-shaped paddle, a condenser with a gas inlet, a thermometer, and a septum. The flask was brought to the Schlenk line and placed under an argon purge. To the flask was added a solution of BEM-1 (31.5 g solution, 44 mmol) and DIAE (4.2 g, 26 mmol). The graduated cylinder used to weigh the BEM-1 was rinsed with heptane (30 mL). The mixture was agitated at 150 rpm.

A solution of 2,4-tetramethylheptadione (TMHD) (16.3 g, 89 mmol) diluted to 50 mL total volume with heptane was added to the addition funnel of the five-necked flask. The TMHD solution was added dropwise to the BEM/DIAE solution. Immediate reaction was seen as the solution grew bright yellow in color. Gas evolution was observed and the solution temperature rose to 50° C. Overtime, the yellow color faded and eventually the solution became colorless. The addition was complete in 20 minutes and the resultant clear solution was free flowing and much less viscous than the initial BEM/DIAE solution. The addition funnel was rinsed with heptane (20 mL) and the solution was allowed to stir for 1 h.

A solution of TiCl$_4$ (19.5 mL, 178 mmol) dissolved to 100 mL total volume with heptane was next added to the addition funnel of the flask. The solution was added dropwise to the BEM/TMHD solution. The solution rapidly turned blue-green, then brown upon TiCl$_4$ addition. Additionally, solids were seen to form. The temperature of the solution was seen to slightly increase (23° C. to 30° C.). Gradually, the solution turned bright orange with both white and orange precipitates present. The addition was complete in 1.5 h. Mixture was allowed to stir at ambient temperature for 1 h. Agitation was discontinued and the solution was heated at 50° C. for 14.5 h.

The deep orange supernatant was decanted from the light orange solid which had settled at approximately 100 mL. The solid was washed with heptane (2×250 mL) and the resultant orange solid was resuspended in heptane (125 mL). Catalyst settling was very slow at this point. The solution was allowed to cool to room temperature.

After 2 h, a solution of Ti(OBu)$_4$ (30.2 g, 89 mmol) diluted to 50 mL total volume with heptane was added to the addition funnel. The solution was added to the reaction mixture over the course of 30 minutes. The solution rapidly turned from bright orange to yellow upon Ti(OBu)$_4$ addition and a slight temperature increase from 23° C. to 30° C. was observed. Additionally, white solid was seen to rapidly form. The settling of the catalyst appeared to grow more rapid. The solution was allowed to stir at room temperature for 1 h. The catalyst was then washed with heptane (4×250 mL) and reslurried in heptane (250 mL).

A solution of TiCl$_4$ (19.5 mL, 178 mmol) diluted to 100 mL total volume with heptane was added dropwise to the solution. No immediate changes were observed. The solution was allowed to stir at room temperature for 1 h. Agitation was discontinued. The solid was found to settle more rapidly than at previous points in the reaction. The solid was washed (4×250 mL) and reslurried in heptane (250 mL). The slurry was next transferred to a 500 mL Schlenk tube. The solution was allowed to settle and the clear supernatant was decanted from the yellow solid. The solid was dried under reduced pressure for 3 h to provide 4.4 g of an orange solid.

Discussion of Example 1

The MDK complex, Mg(TMHD)$_2$ was initially chlorinated with TiCl$_4$ (see equation 2 below). Upon this reagent contacting the Mg(TMHD)$_2$/DIAE solution, the immediate formation of white and orange solids were seen. The white solid most-likely consisted of MgCl$_2$ and the orange solid was presumed to be a titanium-TMHD complex of the general formula, Ti(TMHD) Cl$_4$, (n=1 or 2). In order to solublize the titanium-TMHD complex, a solution of Ti(OBu)$_4$ was added to the mixture. The orange solid quickly dissolved with the addition of Ti(OBu)$_4$, presumably due to rapid ligand redistribution reaction (i.e. chloride/alkoxide exchange). Following washing and a second titanation with TiCl$_4$ the final catalyst, catalyst 1, was obtained.

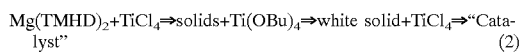

Mg(TMHD)$_2$+TiCl$_4$⇒solids+Ti(OBu)$_4$⇒white solid+TiCl$_4$⇒"Catalyst" (2)

FIG. 1 compares the catalyst particle size distribution for catalyst 1 (♦) made in Example 1 to a conventional catalyst (■). As shown by this curve, the catalyst particle size for catalyst 1 is much broader than that of the conventional catalyst. Additionally, a bimodal distribution is observed as some large particles (ca. 100μ) are also present.

FIG. 2 provides a comparison of the fluff particle size distribution of catalyst 1 (♦) and that of a conventional catalyst (■). Both catalysts provide fluff with a similar D$_{50}$ (ca. 250μ); however, the catalyst 1 fluff spans a much wider range of sizes. This is not particularly unexpected given the broad nature of the catalyst PSD. A large amount (13.6%) of polymer fines were given by catalyst 1 indicating that the integrity of the catalyst was poor.

Example 2

Addition of Ti(OBu)$_4$ Prior to Chlorination (Catalyst 2).

In the drybox, a five-necked, one-liter flask was equipped with a 125 mL addition funnel, a mechanical stirring shaft with a flattened, half moon-shaped paddle, a condenser with a gas inlet, a thermometer, and a septum. The flask was brought to the Schlenk line and placed under an argon purge. To the flask was added a solution of BEM-1 (35.65 g solution, 50 mmol) and DIAE (4.75 g, 30 mmol) diluted to 100 mL total volume with heptane. The graduated cylinder used to measure the BEM and DIAE was rinsed with 50 mL heptane. The solution was mixed at 150 rpm.

A solution of TMHD (18.4 g, 100 mmol) diluted to 50 mL total volume with heptane was added dropwise to the BEM/DIAE solution. The temperature of the solution quickly rose to 50–60° C. and gas evolution was observed. The total addition time was 15 minutes. The addition funnel was rinsed with heptane (20 mL). The clear, free flowing solution was allowed to stir at room temperature for 1 h.

A solution of Ti(OBu)$_4$ (17.0 g, 50 mmol) diluted to 100 mL total volume with heptane was added dropwise to the Mg(TMHD)$_2$/DIAE solution. The solution rapidly turned bright yellow upon Ti(OBu)$_4$ addition. Addition was complete in 20 minutes and the addition funnel was rinsed with heptane (30 mL). The solution was allowed to stir at room temperature for 1 h. Over time, the yellow color of the solution intensified.

A solution of TiCl$_4$ (11 mL, 100 mmol) in heptane was next added dropwise to the reaction. The initial addition rate was very slow (ca. 0.5 drops/sec). Immediately, a waxy white solid was seen to form along with a bright orange precipitate. The waxy solid dissolved rapidly. The orange solid also redissolved, but much more slowly. After 30 mL of solution had been added, the rate of salvation for the waxy solid appeared to decrease and the formation of an insoluble white solid was observed. The rate of the TiCl$_4$ addition was increased to 1 drop/sec at this time. Upon TiCl$_4$ contacting the solution, an orange color was observed which rapidly dissipated. Over time, the solution began to thicken with more white solid being seen to form and the slurry took on an orange color. Addition was complete in 2.25 h. The mixture was stirred at room temperature for 1 h. Agitation was discontinued at this point and the mixture was allowed to stand overnight (14 h).

The mixture was next heated to 50° C. with agitation set at 150 rpm. Over time, the solution grew a slightly brighter orange. After 1 h, the agitation was discontinued and the slurry was allowed to settle. Settling was very slow (ca. 30 min). The solid was washed with heptane (4×325 mL). The solid settling was seen to improve with each washing. The orange color of the supernatant decreased with each wash. The final yellow solid was reslurried in heptane (250 mL) and the solution was allowed to cool to room temperature.

A solution of TiCl$_4$ (11 mL, 100 mmol) was next added dropwise to the slurry. No immediate changes were observed. Addition was complete in 1 h and the mixture was allowed to stir at room temperature for 45 min.

Agitation was discontinued and the solution was allowed to settle. Settling of the now orange solid was very fast (less than 1 min). The solid was washed with heptane (4×250 mL). The resultant solid was reslurried in heptane (250 mL).

A solution of TEAl (3.9 g, 8.5 mmol) diluted to 50 mL total volume with heptane was next added dropwise to the slurry. Immediately, the solution turned dark brown and large white chunks were seen to form as the TEAl contacted the slurry. Addition was complete in 15 min. and the mixture was allowed to stir at room temperature for 1 h. The remaining solution was transferred to a Schlenk tube and allowed to settle. The supernatant was removed and the resultant solid was dried under reduced pressure for 2 h to afford 5.062 g of catalyst 2 as a gray solid.

Discussion of Example 2

In an effort to slow the reaction of Mg(TMHD)$_2$ with TiCl$_4$, the catalyst preparation described in Example 1 above was repeated except that Ti(OBu)$_4$ was added to the Mg(TMHD)$_2$ complex before TiCl$_4$ (equation 3).

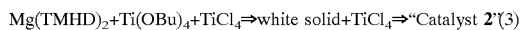

Mg(TMHD)$_2$+Ti(OBu)$_4$+TiCl$_4$⇒white solid+TiCl$_4$⇒"Catalyst 2"(3)

FIG. 3 shows the particle size distribution for catalyst 2, the catalyst produced according to this method. Included for comparison is the distribution given by catalyst 1 (the catalyst of Example 1 prepared by adding Ti(OBu)$_4$ after TiCl$_4$). The D$_{50}$ for catalyst 1 is significantly larger than that of catalyst 2, but the distribution is still much broader than desired. This indicates that the precipitation of the MgCl$_2$ support is occurring in a less than uniform manner. The fluff particle size distribution for catalyst 2 is given in FIG. 4. From this figure, it is seen that the fluff distribution is slightly more regular than in the case of catalyst 1; additionally, the number of fines (fines are particles below 125μ) is down slightly to 11.1%. Therefore, it appears as if a slight improvement in the catalyst integrity can be obtained by addition of Ti(OBu)$_4$ prior to TiCl$_4$ in the catalyst preparation.

Example 3

Precipitation With Ti(OBu)$_4$/TiCl$_4$ (Catalyst 3)

In the drybox, a five-necked, one-liter flask was equipped with a 125 mL addition funnel, a mechanical stirring shaft with a flattened, half moon-shaped paddle, a condenser with a gas inlet, a thermometer, and a septum. The flask was brought to the Schlenk line and placed under an argon purge. To the flask was added a solution of BEM-1 (24.3 g solution, 34 mmol) and DIAE (3.23 g, 20.4 mmol) diluted to 100 mL total volume with heptane. The mixture was agitated at 150 rpm.

A solution of TMHD (12.56 g, 68 mmol) diluted to 50 mL total volume with heptane was added to the addition funnel of the five-necked flask. The TMHD solution was added dropwise to the BEM/DIAE solution. Immediate reaction was seen as the solution grew bright yellow in color. Gas evolution was observed and the solution temperature rose to 50° C. Over time, the yellow color faded and eventually the solution became colorless. The addition was complete in 25 minutes and the resultant clear solution was free flowing and much less viscous than the initial BEM/DIAE solution. The addition funnel was rinsed with heptane (2×25 mL) and the solution was allowed to stir for 1 h.

To the reaction was next added dropwise a mixture of Ti(OBu)$_4$ (23.1 g, 68 mmol) and TiCl$_4$ (8 mL, 75 mmol) in 50 mL heptane. The solution turned light yellow upon TiCl$_4$/Ti(OBu)$_4$ addition. A white waxy solid was seen to form as the mixture contacted the Mg(TMHD)$_2$/DIAE solution. This solid rapidly redissolved up until 15 mL of the mixture had been added. The solution then grew cloudy as an insoluble white precipitate was seen to form. Over time, the amount of solid increased and the solution turned bright yellow then orange. Addition was complete in 1.5 h. The addition funnel was rinsed with heptane (2×50 mL). The solution was allowed to stir at room temperature for 1 h. The solution was then heated to 60° C. After 1 h, agitation was discontinued and the solution was held at 60° C. overnight (12 h).

The solid was next washed with heptane (4×250 mL). The supernatant grew less yellow after each washing. The settling of the catalyst was rather rapid (less than 2 min). The final yellow solid was reslurried in heptane (170 mL) and allowed to cool to room temperature.

A solution of TiCl$_4$ (8.0 mL, 75 mmol) diluted to 50 mL total volume with heptane was next added dropwise at a rate of 1.5 drops/sec to the slurry. The slurry rapidly turned orange upon TiCl$_4$ addition. The addition was complete in 25 min and the mixture was stirred at room temperature for 1 h.

The agitation was discontinued and the solution was allowed to settle. The solution was slightly yellow and the solid was orange in color. The solid was washed with heptane (4×250 mL). The final orange solid was reslurried in heptane (170 mL). The remaining slurry was transferred to a Schlenk tube and allowed to settle. The supernatant was decanted and the resultant solid was dried under reduced pressure to afford 4.63 g of catalyst 3 as a light yellow powder.

Discussion of Example 3

The Mg(TMHD)$_2$ complex was next treated with a mixture of Ti(OBu)$_4$/TiCl$_4$ (1:1), a more mild chlorinating agent (equation 4).

$$Mg(TMHD)_2 + TiCl_4/Ti(OBu)_4 \Rightarrow solid + TiCl_4 \Rightarrow \text{"Catalyst 3"} \quad (4)$$

FIG. 5 compares the particle size distribution for the catalyst made using this modification (catalyst 3) to that produced by the direct reaction of $Mg(TMHD)_2$ with $TiCl_4$ (catalyst 1 of example 1). The particle size distribution for catalyst 3 is much more narrow than that given by catalyst 1; additionally, the catalyst $D_{50}$ is nearly twice as large when $Ti(OBu)_4/TiCl_4$ mixture is used as the chlorinating source. The catalyst 3 distribution does, however, display a slight amount of undesired tailing into the low particle size region. The fluff particle size distribution for catalyst 3 is given in FIG. 6. The catalyst 3 fluff distribution is fairly narrow and the number of fines has been decreased to 6.0%. Finally, the fluff bulk density is 0.28 g/cc for catalyst 3 which is higher than the values of 0.21 and 0.22 g/cc given by catlyst 1 and catalyst 2, respectively. Thus treatment of the $Mg(TMHD)_2$ with the $Ti(OBu)_4/TiCl_4$ mixture appears to represent a substantial improvement over the direct chlorination methods employed to produce catalyst 1 and catalyst 2.

Example 4

Use of $ClTi(O^iPr)_3$ Chlorinating Agent (Catalyst 4).

In the drybox, a five-necked, one-liter flask was equipped with a 125 mL addition funnel, a mechanical stirring shaft with a flattened, half moon-shaped paddle, a condenser with a gas inlet, a thermometer, and a septum. The flask was brought to the Schlenk line and placed under an argon purge. To the flask was added a solution of BEM-1 (35.65 g solution, 50 mmol) and DIAE (4.75 g, 30 mmol) diluted to 100 mL total volume with heptane. The graduated cylinder used to measure the BEM and DIAE was rinsed with 50 mL heptane. The solution was mixed at 150 rpm.

A solution of TMHD (18.4 g, 100 mmol) diluted to 50 mL total volume with heptane was added at a rate of 2 drops/sec to the BEM/DIAE solution. The temperature of the solution quickly rose to 65° C. and gas evolution was observed. The solution rapidly turned bright yellow. After 25 mL of TMHD had been added, the yellow color began to fade and gradually, the solution turned completely colorless. The total addition time was 25 minutes. The addition funnel was rinsed with heptane (2×25 mL). The clear, free flowing solution was allowed to stir at room temperature for 1 h.

A solution of $ClTi(O^iPr)_3$ (38.75 g, 50 mmol) diluted to 100 mL total volume with heptane was added to the $Mg(TMHD)_2$/DIAE solution at a rate of 1 drop/sec. After 10 mL of solution had been added, the solution took on a yellow color which grew brighter over time. After 75 mL of solution has been added, the solution began to grow cloudy. Addition was complete in 1 h and the cloudy solution was allowed to stir at room temperature for 1 h.

A solution of $TiCl_4$ (11 mL, 100 mmol) in heptane 100 mL was added dropwise to the solution at a rate of approximately 1 drop/sec. Upon $TiCl_4$ contacting the solution, an orange color was seen to form which rapidly dissipated. The solution grew cloudier throughout the $TiCl_4$ addition. Over time, the slurry began to thicken and eventually took on an orange color. Total addition time was 2 h. The slurry was stirred at room temperature for 1 h. Agitation was discontinued. The catalyst settling was very slow at this point (10 min). After the solid had settled completely, the clear orange supernatant was decanted and the resultant yellow solid was washed with heptane (4×250 mL). The final solid was reslurried in heptane (250 mL).

A solution of $TiCl_4$ (11 mL, 100 mmol) diluted to 100 mL total volume with heptane was added to the slurry at a rate of 1.5 drops/sec. No immediate changes were seen. Addition was complete in 1.5 h and the addition funnel was rinsed with heptane (2×25 mL).

The reaction was next gradually heated to 60° C. Over time, the slurry appeared to thicken. Sample 4-E was taken here. After 3 h, the agitation was discontinued. The clear orange supernatant was decanted and the resultant yellow solid was washed with heptane (4×250 mL). The final solid was resuspended in heptane (250 mL). The remaining slurry was allowed to stand unstirred at 60° C. for 14 h (catalyst 4).

Discussion of Example 4

The use of $ClTi(O^iPr)_3$, a very mild chlorinating agent, with $Mg(TMHD)_2$ was also examined. Here the $Mg(TMHD)_2$ complex was treated with one equivalent of the monochloride, $ClTi(O'Pr)_3$, in an effort to generate, $ClMg(TMHD)$ which could be fully converted to $MgCl_2$ upon reaction with $TiCl_4$ (equation 5).

$$Mg(TMHD)_2 + ClTi(O^iPr)_3 z,900 \text{ solid} + TiCl_4 \Rightarrow \text{"Catalyst 4"} \quad (5)$$

FIG. 7 compares the particle size distribution for the catalyst prepared in this manner (catalyst 4) to the catalyst prepared using the $Ti(OBu)_4/TiCl_4$ mixture (catalyst 3). The figure shows that the distribution for catalyst 4 is very narrow and, unlike that of catalyst 3, no tailing was observed. The $D_{50}$ for the catalyst prepared using $ClTi(O^iPr)_3$ is roughly half that given for the catalyst prepared using the $Ti(OBu)_4/TiCl_4$ mixture. FIG. 8 shows the fluff particle size distributions provided by catalyst 4 and catalyst 3. The Dso for the fluff is $200\mu$ compared to that of $250\mu$ for catalyst 3 perhaps reflecting the decrease seen in the catalyst particle size upon chlorination with $ClTi(O^iPr)_3$. The number of fines for catalyst 4 is 21.4%, a substantial increase over the value of 6.0% given for catalyst 3.

Example 5

Substituent Effects (Part 1): acac Derived Catalyst (Catalyst 5)

In the drybox, a five-necked, one-liter flask was equipped with a 125 mL addition funnel, a mechanical stirring shaft with a flattened, half moon-shaped paddle, a condenser with a gas inlet, a thermometer, and a septum. The flask was brought to the Schlenk line and placed under an argon purge. To the flask was added a solution of BEM-1 (35.65 g solution, 50 mmol) and DIAE (4.75 g, 30 mmol) diluted to 100 mL total volume with heptane. The graduated cylinder used to measure the BEM and DIAE was rinsed with 20 mL heptane. The solution was mixed at 150 rpm.

A solution of acac (2,4-pentanedione) (10.01 g, 100 mmol) diluted to 50 mL total volume with heptane was added at a rate of 0.5 drops/sec to the BEM/DIAE solution. The temperature of the solution quickly rose to 50–60° C. and gas evolution was observed. The solution rapidly turned bright yellow. After 30 mL of acac had been added, the solution became cloudy. Over time pale yellow solid was seen to form. The total addition time was 50 minutes. The addition funnel was rinsed with heptane (10 mL). In an effort to solublize the white solid, the solution was heated to 50° C. for 0.5 h. A small amount of solid appeared to dissolve upon heating.

A solution of $Ti(OBu)_4$ (34.1 g, 100 mmol) diluted to 100 mL total volume with heptane was next added dropwise to the $Mg(acac)_2$/DIAE solution over the course of 15 min. Some of the white solid appeared to dissolve upon $Ti(OBu)_4$ addition. The solution was heated to 90° C. in an effort to dissolve the solid. Despite this, the solution remained cloudy. After 2 h, the solution was allowed to cool to room temperature.

A solution of $TiCl_4$ (22 mL, 200 mmol) diluted to 100 mL total volume with heptane was next added to the solution at a rate of 1 drop/sec. Fuming and a slight temperature increase was observed upon $TiCl_4$ addition. Gradually, the solution grew orange in color as a fine white precipitate was seen to form. After 30 mL of the $TiCl_4$ solution had been added, the slurry was grew thick with the formation of white solid and the solution turned bright orange. The addition was complete in 1.25 h. The mixture was then heated to 90° C. to improve the catalyst settling which was very slow at this point. Over time, the solution darken to cherry red and the now light orange solid appeared to settle faster. After heating for 1 h, the solution was allowed to settle. Settling was rapid (less than 2 min) and the deep red supernatant was decanted away from the light yellow solid. The solid was reconstituted in heptane (250 mL) and allowed to cool to room temperature.

A solution of $TiCl_4$ (22 mL, 200 mmol) diluted to 100 mL total volume with heptane was added dropwise to the slurry over the course of 30 min. The slurry darkened to a burnt orange color upon $TiCl_4$ addition. The solution was next heated to 50° C. to solublize any titanium-acac complexes still present. Aagitation was discontinued. The solid was washed with heptane (4×250 mL) and the resultant solid, now red/brown in color, was resuspended in heptane (250 mL).

To the remaining slurry was added a solution of TEAl (3.5 g) diluted to 35 mL with heptane. The slurry turned black almost instantaneously upon TEAl addition. The total addition time was 30 min. The solution was stirred an additional 30 minutes. The remaining slurry was dried under reduced pressure to afford 2.1 g of catalyst 5 as a dark solid.

Discussion of Example 5

The effects of the steric nature of the magnesium diketonate (MDK) precursor complex on the catalyst performance was also briefly investigated. Accordingly, MDK complexes were also prepared from the less sterically demanding pentane-2,4-dione (acac).

In this preparation, a BEM/DIAE solution was reacted with two equivalents of acac. Unlike the TMHD derivative described above, the $Mg(acac)_2$ complex produced in this reaction was found to be only partially soluble in heptane. $Ti(OBu)_4$ was next added and the reaction was heated to 50° C. in an effort to dissolve the solid. The solid dissolved slightly upon heat treatment. The $Mg(acac)_2/Ti(OBu)_4$ mixture was next treated with excess $TiCl_4$ to provide the $MgCl_2$ which, after washing was subjected to a second titanation procedure to afford the final catalyst (equation 6).

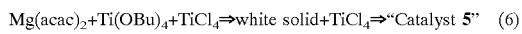
$Mg(acac)_2+Ti(OBu)_4+TiCl_4 \Rightarrow$ white solid+$TiCl_4 \Rightarrow$ "Catalyst 5" (6)

FIG. 9 compares the particle size distribution for the $Mg(acac)_2$-derived catalyst (catalyst 5) to that afforded by $Mg(TMHD)_2$ complex (catalyst 2). As shown by the figure, the size of both the catalysts are similar. The $Mg(acac)_2$-based catalyst, however, possesses a narrower distribution than the $Mg(TMHD)_2$-derived catalyst. FIG. 10 shows the fluff particle size distributions given by catalyst 5 and catalyst 2. While the $D_{50}$ is similar for the fluff given by both catalysts, the distribution is narrower for that of the Mg(acac) 2 derived catalyst (catalyst 5). Additionally, the amount of fines for 5-F is 3.4%—significantly less than the value of 11.1% given by catalyst 2. Despite this apparent improvement, the fluff bulk density is very low (0.21 g/cc) for catalyst 5. Additionally, the fluff has an agglomerated, popcorn-like appearance. This type of agglomeration typically provides fluff with low fines even though the morphology is poor and undesirable.

Example 6

Substituent Effects (Part 2): EPD Derived Catalyst (Catalyst 6)

In the drybox, a five-necked, one-liter flask was equipped with a 125 mL addition funnel, a mechanical stirring shaft with a flattened, half moon-shaped paddle, a condenser with a gas inlet, a thermometer, and a septum. The flask was brought to the Schlenk line and placed under an argon purge. To the flask was added a solution of BEM-1 (35.65 g solution, 50 mmol) and DIAE (4.75 g, 30 mmol) diluted to 100 mL total volume with heptane. The solution was mixed at 150 rpm.

A solution of EPD (12.82 g, 100 mmol) in diluted to 50 mL total volume with heptane was added at a rate of 1.5 drops/sec to the BEM/DIAE solution. The temperature of the solution quickly rose to 50–60° C. and gas evolution was observed. The solution rapidly turned light yellow. After 25 mL of EPD had been added, the solution grew slightly more viscous and darkened to orange. The total addition time was 45 min. The addition funnel was rinsed with heptane (2×25 mL). Gradually, a small amount of white solid was seen to form and the solution grew cloudy.

A mixture of $Ti(OBu)_4$ (34.1 g, 100 mmol) and $TiCl_4$ (11 mL, 100 mmol) diluted to 120 mL total volume with heptane was next added to the $Mg(EPD)_2$/DIAE solution at a rate of 1.5 drops/sec. Rapidly, a white waxy solid was seen to form as the $Ti(OBu)_4/TiCl_4$ mixture contacted the solution. Over time, the large, waxy particles appeared to grow smaller and more uniform in size. After 20 mL of the mixture had been added, the solution was thick with white precipitate. Additional was complete in 55 min. The mixture was stirred at room temperature for 1 h.

The slurry was next heated to 60° C. With time, some of the large white particles appeared to breakdown. After 4 h, agitation was discontinued and the reaction was allowed to stand at 60° C. overnight (18 h).

The orange solution was decanted and the resultant yellow solid was washed with heptane (4×250 mL) Settling was somewhat slow at this point (ca. 3 min) The solid was resuspended in heptane (250 mL). Heating was discontinued and the solution was allowed to cool to room temperature.

After the solution had cooled, $TiCl_4$ (11 mL, 100 mmol) diluted to 100 mL total volume with heptane was added to the slurry at a rate of 2 drops/sec. The light orange solution darkened slightly upon $TiCl_4$ addition. $TiCl_4$ addition was complete in 45 min. The slurry gradually turned burnt orange in color with a small amount of white chunks being present in addition to the white precipitate. Mixture was stirred at room temperature for 1 h.

Agitation was discontinued and the slurry was allowed to settle. Settling was fairly rapid (ca. 2 min). The solid was washed with heptane (4×250 mL) and the final catalyst was reslurried in heptane (250 mL). The remaining slurry was transferred to a Schlenk tube and the solvent was removed under reduced pressure to afford 7.56 g of a light orange solid (catalyst 6).

Discussion of Example 6

The effects of the steric nature of the MDK precursor complex on the catalyst performance were again briefly investigated. Accordingly, MDK complexes were also prepared from the less sterically demanding 3-ethylpentane-2,4-dione (EPD).

Mg(EPD)$_2$ was prepared by reaction of BEM/DIAE with two equivalents of EPD. Like the Mg(acac)$_2$ derivative described above, Mg(EPD)$_2$ is not completely solvated in heptane. The Mg(EPD)$_2$ complex was next chlorinated with a Ti(OBu)$_4$/TiCl$_4$ mixture. The resultant MgCl$_2$-support was washed and treated with TiCl$_4$ to obtain the final catalyst (equation 7)

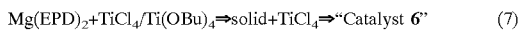

Mg(EPD)$_2$+TiCl$_4$/Ti(OBu)$_4$⇒solid+TiCl$_4$⇒"Catalyst 6"      (7)

FIG. 11 compares the catalyst PSD for catalyst 6 to that given by the Mg(TMHD)$_2$-based catalyst prepared under similar conditions (catalyst 3). As shown by the figure, the distributions given by the catalysts are very similar. The fluff particle size distribution given by catalyst 6 is shown in FIG. 12 where it is compared to that given by catalyst 3. The distribution is much smoother for the Mg(EPD)$_2$ derived catalyst (catalyst 6) compared to the Mg(TMHD)$_2$ based catalyst (catalyst 3). Additionally, catalyst 6 provided 1.2% fines compared to 6.0% for catalyst 3. Unfortunately, the bulk density for the catalyst 6 fluff is 0.20 g/cc which is significantly lower than the value of 0.28 g/cc given catalyst 3. An undesirable, popcorn-like polymer morphology, similar to that of the Mg(acac)$_2$ derived catalyst, was observed for catalyst 6.

Example 7 acac Catalyst Synthesis Without DIAE (Catalyst 7)

In the drybox, a five-necked, one-liter flask was equipped with a 125 mL addition funnel, a mechanical stirring shaft with a flattened, half moon-shaped paddle, a condenser with a gas inlet, a thermometer, and a septum. The flask was brought to the Schlenk line and placed under an argon purge. To the flask was added a solution of BEM-1 (35.65 g solution, 50 mmol) diluted to 100 mL total volume with heptane. The viscous solution was mixed at 150 rpm.

A solution of acac (10.01 g, 100 mmol) in diluted to 50 mL total volume with heptane was added to the BEM solution. The temperature of the solution quickly rose to 50° C. and gas evolution was observed. The solution rapidly turned yellow. Over time, the solution grew less viscous. After 25 mL of acac had been added, the solution became cloudy. Over time a large amount of white solid was seen to form. The total addition time was 30 minutes. The addition funnel was rinsed with heptane (20 mL). Mixture was stirred at room temperature for 1 h.

A solution of Ti(OBu)$_4$ (34.04 g, 100 mmol) diluted to 100 mL with heptane was next added dropwise to the yellow slurry. No immediate changes were seen upon Ti(OBu)$_4$ addition. Over time, it appeared as if the white particles in the yellow solution grew finer. Addition was complete in 20 min. and the mixture was allowed to stir at room temperature for 1 h. Gradually, the solution took on a bright yellow appearance.

A solution of TiCl$_4$ (15 mL of 0.85 M solution, 12.8 mmol) was added dropwise to the BEM/ACAC/Ti(OBu)$_4$ solution. The solution smoked upon TiCl$_4$ addition and a small temperature increase was observed (from 23 to 30° C.). The solution also took on a bright orange appearance. Total addition time was 20 min. The solution was allowed to stir at room temperature for 1.5 h.

A solution of TiCl$_4$ (117.5 mL of a 0.85 M solution, 100 mmol) was next added dropwise to the slurry. The solution grew deeper orange upon TiCl$_4$ addition and more white solid was seen to form. Addition was complete in 45 min and the solution was allowed to stir at room temperature for 30 min. The solution was next heated to 90° C. Over time, the solution darkened to a deep red color. After 3 h, the agitation was discontinued and the solid was allowed to settle. Settling was very slow at this point (greater than 5 min). The solid was washed with heptane (4×250 mL) and the light red solid was resuspended in heptane (250 mL).

A solution of TiCl$_4$ (117.5 mL of a 0.85 M solution in heptane) was added to the slurry. No immediate changes were seen upon TiCl$_4$ addition. The addition was complete in 25 min and the mixture was stirred at room temperature for 1 h. Agitation was discontinued at this point and the slurry was allowed to settle. Settling was slightly faster at this point (ca. 4 min). The resultant solid was washed with heptane (4×250 mL).

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

We claim:

1. A process for forming a catalyst component, the process comprising:

a) contacting a metal compound of the formula MR$_2$ with a diketone to form a metal bis(diketonate) having the formula M(OCRCR'CRO)$_2$, having a structure:

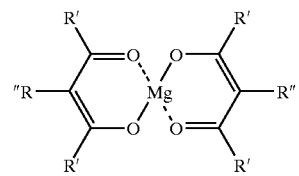

wherein M is a Group IIA or Group VIIB metal, and wherein R and R' are each hydrocarbyls or substituted hydrocarbyls having from 1 to 20 carbons atoms; and b) contacting the metal bis(ketonate) with a first halogenating agent to form reaction product A.

2. The process of claim 1 further comprising:

c) contacting reaction product A with a second halogenating agent to form a catalyst component.

3. The process of claim 1 wherein M is magnesium, wherein R and R' are independently selected from the group consisting of hydrogen, methyl, methylethyl, butyl, and butylethyl, and wherein the diketone is tetramethylheptadione.

4. The process of claim 2 wherein the first halogenating agent is a mixture of Ti(OBu)$_4$ and TiCl$_4$, and the second halogenating agent is TiCl$_4$.

5. The process of claim 2 wherein any one of steps a), b), and c) further comprises an electron donor.

6. A process for forming a polyolefin catalyst, the process comprising:

a) contacting a catalyst component with an organometallic compound to form a catalyst, wherein the catalyst component is produced by a process comprising i) contacting a metal compound of the formula MR$_2$ with a diketone to form a metal bis(diketonate) having the formula M(OCRCR'CRO)$_2$, having a structure:

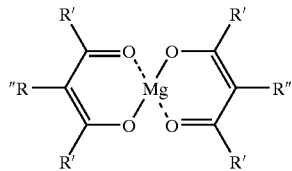

wherein M is a Group IIA or Group VIIB metal, and wherein R and R' are each hydrocarbyls or substituted hydrocarbyls having from 1 to 20 carbons atoms; and ii) contacting the metal bis(ketonate) with a first halogenating agent to form reaction product A.

7. The process of claim 6 wherein the catalyst component is produced by a process further comprising:

iii) contacting reaction product A with a second halogenating agent.

8. The process of claim 6 wherein M is magnesium, wherein R and R' are independently selected from the group consisting of hydrogen, methyl, methylethyl, butyl, and butylethyl, and wherein the diketone is tetramethylheptadione.

9. The process of claim 6 wherein the first halogenating agent is a mixture of Ti(OBu)$_4$ and TiCL$_4$, and the second halogenating agent is TiCl$_4$.

10. The process of claim 6 wherein any one of steps i), ii), and iii) further comprises an electron donor.

11. A process of making a catalyst system, the process comprising:

a) contacting a polyolefin catalyst with an inert support, wherein the catalyst is produced by a process comprising i) contacting a metal compound of the formula MR$_2$ with a diketone to form a metal bis(diketonate) having the formula M(OCRCR'CRO)$_2$, having a structure:

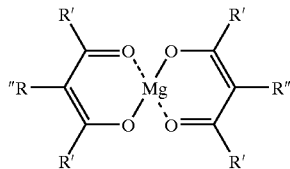

wherein M is a Group IIA or Group VIIB metal, and wherein R and R' are each hydrocarbyls or substituted hydrocarbyls having from 1 to 20 carbons atoms; and ii) contacting the metal bis(ketonate) with a first halogenating agent to form reaction product A.

12. The process of claim 11 wherein the catalyst is produced by a process further comprising:

iii) contacting reaction product A with a second halogenating agent to form a catalyst component.

13. The process of claim 11 wherein M is magnesium, wherein R and R' are independently selected from the group consisting of hydrogen, methyl, methylethyl, butyl, and butylethyl, and wherein the diketone is tetramethylheptadione.

14. The process of claim 11 wherein the inert support is a magnesium compound.

* * * * *